United States Patent
Marissal et al.

(10) Patent No.: US 7,943,727 B2
(45) Date of Patent: May 17, 2011

(54) POLYMER STREAM TRANSFER

(75) Inventors: Daniel Marissal, Carry le Rouet (FR); Brent R Walworth, Sint-Niklaas (BE)

(73) Assignee: Ineos Manufacturing Belgium NV, Antwerpen (BE)

( * ) Notice: Subject to any disclaimer, the term of this patent is extended or adjusted under 35 U.S.C. 154(b) by 9 days.

(21) Appl. No.: 12/311,659

(22) PCT Filed: Oct. 4, 2007

(86) PCT No.: PCT/EP2007/008601
§ 371 (c)(1),
(2), (4) Date: Apr. 8, 2009

(87) PCT Pub. No.: WO2008/043472
PCT Pub. Date: Apr. 17, 2008

(65) Prior Publication Data
US 2009/0312513 A1 Dec. 17, 2009

(30) Foreign Application Priority Data

Oct. 12, 2006 (EP) .................... 06255259
Oct. 12, 2006 (EP) .................... 06255272
Oct. 12, 2006 (EP) .................... 06255273

(51) Int. Cl.
*C08F 6/00* (2006.01)
*C08J 3/00* (2006.01)

(52) U.S. Cl. .......... 528/501; 422/144; 422/145; 526/65; 526/348; 526/351; 526/352; 528/480

(58) Field of Classification Search ............ 422/144, 422/145; 526/65, 348, 351, 352; 528/501, 528/480
See application file for complete search history.

(56) References Cited

U.S. PATENT DOCUMENTS

| | | | |
|---|---|---|---|
| 4,020,032 A | 4/1977 | Kalka et al. | |
| 4,126,743 A | 11/1978 | Shiomura et al. | |
| 4,184,036 A | 1/1980 | Shiomura et al. | |
| 7,741,430 B2 * | 6/2010 | Walworth | 528/501 |
| 7,759,457 B2 * | 7/2010 | Walworth | 528/501 |
| 2008/0214745 A1 * | 9/2008 | Walworth | 526/65 |
| 2009/0062485 A1 * | 3/2009 | Walworth | 526/65 |

FOREIGN PATENT DOCUMENTS

| GB | 2 157 701 A | 10/1985 |
|---|---|---|
| WO | WO 2005/044872 A1 | 5/2005 |

OTHER PUBLICATIONS

PCT International Preliminary Report on Patentability; PCT International No. PCT/EP2007/008601; Int'l Filing Date Oct. 4, 2007.

* cited by examiner

*Primary Examiner* — Terressa M Boykin
(74) *Attorney, Agent, or Firm* — Nixon & Vanderhye

(57) ABSTRACT

Process for heating a polymer-containing stream being transferred from a polymerization reactor to a degassing vessel operating at a pressure between 6 bara and 12 bara. The process includes passing the stream through a heater comprising a transfer line for the stream and a device for heating the transfer line. The ratio of the stream velocity at the outlet of the heater to that at the inlet, $V_o/V_i$, is at least 1.1, typically between 1.2 and 4, and the total specific heat transfer area of the transfer line is at least 0.5 m² per tonne/h of production of polymer. The pressure drop across the length of the heater is less than 0.5 bar per tonne/h of polymer, such that at least 90 mol % of the hydrocarbon fluids withdrawn from the polymerization reactor operation are vaporized before entry into the degassing vessel.

44 Claims, No Drawings

POLYMER STREAM TRANSFER

This application is the U.S. National Phase of International Application PCT/EP2007/008601, filed Oct. 4, 2007, which designated the U.S. PCT/EP2007/008601 claims priority to European Application Nos. 06255259.1, 06255273.2, and 06255272.4, filed Oct. 12, 2006, respectively. The entire content of these applications are incorporated herein by reference.

The present invention concerns apparatus for improving the degassing of polymers, particularly olefin polymers.

Polymerisation of olefins in which an olefin monomer and optionally olefin comonomer are polymerised, usually in the presence of a catalyst and/or a diluent, is well known. The polymer is withdrawn from the polymerisation reactor together with the reagents and inert hydrocarbons. The reagents and hydrocarbons need to be recovered for economic, safety and environmental reasons, and many processes for achieving this are known in the art. These processes generally involve depressurising and devolatilising the polymer-containing stream after it has been withdrawn from the polymerisation reactor. The volatisation requirement is greatest in processes having polymer withdrawn from the reactor with high absorbed or free liquid hydrocarbon contents. These are typically processes producing polymers with a significant low density component or amorphous phase where the absorption of hydrocarbon is high, and/or processes where the polymer is produced in the presence of liquid hydrocarbons (reactive or inert).

The maximum capacity of commercial scale plant has increased steadily over the years, and as production rates have increased the potential cost impact of unreliability in any part of the process has also significantly increased, impacting not only the polymer unit itself but also upstream and downstream units. At the same time, growing operating experience has led to operation of increasingly high solids concentrations (loadings) of polymer withdrawn from reactors. The increase in solids concentrations in slurry polymerisation units has typically been achieved with increased circulation velocities achieved for example by higher reactor power requirements as illustrated by EP 432555 and EP 891990. This increase in solids loadings is desirable as it increases reactor residence time for a fixed reactor volume and also reduces downstream diluent treatment and recycling requirements. However, the transfer of the product at high solids loadings is more problematic and careful design and operating practices are required to avoid polymer fouling and blockage problems that would not have been experienced at lower solids loadings.

During, and as a result of, the process of depressurising and devolatilising the polymer stream withdrawn from the polymerisation reactor, the temperature of the polymer reduces. It is well known that the process of devolatilising and desorbing the polymer is significantly enhanced by maintaining the polymer at as high a temperature as possible. Thus, in slurry loop processes the transfer line between the polymerisation reactor and the depressurisation (degassing) vessel for the polymer stream is usually heated. As an example of a typical process, in WO 04/031245 and WO 05/044871 the take-off line from a loop polymerisation reactor comprises a flashline containing the drawn-off slurry, surrounded by a conduit which is provided with a heated fluid such as low-pressure steam in order to provide indirect heating to the slurry. However it is also well known that the stickiness and susceptibility of polymer being transferred to agglomerate and/or foul transfer lines and vessels generally increases with temperature, and problems of fouling or agglomeration are becoming more significant with the increasing solids loadings in the transfer system now being utilised as mentioned above. As a result, careful design of the transfer line from the polymerisation reactor is required in order to achieve sufficient heating to aid devolatilisation without risking fouling or agglomeration of the solid polymer.

Devolatilisation of the polymer stream causes the liquid phase of the stream to vaporise, resulting in an increase in volume in the transfer line and a consequent increase in stream velocity. However if the velocity becomes too high it may exceed the sonic velocity (the speed of sound in the medium), leading to disruption of the flow. On the other hand, if the initial velocity is too low there is an increased risk of fouling or agglomeration of the solid polymer as mentioned above.

A further consideration is that in large plants the transfer line has to be very long in order to allow sufficient heating to take place, and the length can be sufficiently great to impact the spatial planning of the plant. This can create a variety of problems such as footprint of the hardware in the plant, and control of the conditions inside the line. Often it is necessary to heat a significant proportion of the transfer line length to satisfy the heat input requirements. Thus it will be appreciated that ensuring that the polymer stream arrives at the degassing vessel at the desired temperature and pressure and with the minimum of fouling/agglomeration is a significant technical challenge.

The present invention seeks to optimise heating of the polymer during its transfer from the reactor to the degassing vessel and at the same time to maintain reliable product transfer, by particular construction of the transfer line between the polymerisation reactor and the degassing vessel for the polymer stream.

Accordingly in a first aspect the invention provides a process for heating a polymer-containing stream being transferred from a polymerisation reactor to a degassing vessel, comprising passing the stream through a heater comprising a transfer line for the stream and means for heating the transfer line, wherein the ratio of the average stream velocity at the outlet of the heater to that at the inlet, $V_o/V_i$, is at least 1.1, preferably between 1.5 and 4.

It will be appreciated that the polymer-containing stream passes through some form of pipeline at all times from the moment it leaves the polymerisation reactor until it enters the degassing vessel. For the purposes of this invention, the heater is considered to comprise the portion of pipeline from the beginning of the heated section (or first of the heated sections) until the end of the heated section (or last of the heated sections). In this context the term "heater" as used hereinafter includes within its scope the possibility of a number of heaters connected in series. The outlet of the heater (or transfer line of the heater) is considered to be at the end of the heated section of the line, and the inlet of the heater is considered to be at the start of the heated section of the line, where the heated section of the line incorporates the single heater or multiple heaters in series. By "line" is meant any form of conduit suitable for transporting a polymer-containing stream containing solids, liquid and gas. Thus $V_i$ and $V_o$ are the average velocities at the inlet and outlet of the transfer line/heater where "inlet" and "outlet" are as defined above. By "average velocity" is meant the average velocity across the entire cross-section of the stream at any one point along the length of the transfer line, such as the outlet or the inlet.

For the process of the invention it is important to maintain the average velocity of the polymer-containing stream sufficiently high to avoid the risk of fouling or blockages. We have found that the design of the transfer line according to the invention permits reliable operation whilst controlling the ratio of $V_o/V_i$ within the preferred limits. Typical values for $V_i$ are 3-20 m/s, and typical values for $V_o$ are 30-80 m/s.

It is preferred that the transfer line for the stream is at least 20 m in length, and that the temperature of the polymer-containing stream at the heater exit is above the dew point of the stream, and the temperature of the stream along the length of the transfer line is maintained below the softening point of the polymer, where the softening point of the polymer is defined as the Vicat softening temperature according to ASTM D1525, ISO 306 under a load of 10N.

Preferably, the temperature of the polymer-containing stream at the heater exit is 5-80° C., most preferably 10-30° C., above the dew point of the stream.

It is also preferred that the temperature of the internal surface of the transfer line along its length is maintained below the softening point of the polymer.

The polymer-containing stream is preferably withdrawn from a polymerisation reactor prior to entry into the heater, and the heater inlet is therefore linked directly to the polymerisation reactor. It is also preferred that the outlet of the heater is connected directly to a degassing vessel, which is usually upstream of the final polymer treatment and extrusion or upstream of a further polymerization reactor. The stream may be continuously withdrawn from the polymerisation reactor, and may or may not contain active polymer.

The Vicat softening temperature according to ASTM D1525, ISO 306 is the temperature at which a flat-ended needle penetrates a specimen of the polymer to a depth of 1 mm under a load of 10N. The temperature reflects the point of softening to be expected when a material is used in an elevated temperature application. A test specimen, which is between 3 mm and 6.5 mm thick and at least 10 mm in width and length, is placed in the testing apparatus (for example a ROSAND ASP 6 HDT/VICAT System) so that the penetrating needle, which has a cross-sectional area at its tip of 1 $mm^2$, rests on the specimen surface at least 1 mm from the edge. A load of 10N is applied to the specimen. The specimen is then lowered into an oil bath at 23° C. The bath is raised at a rate of 50° C. per hour until the needle penetrates 1 mm; the temperature at which this occurs is the Vicat softening temperature.

The pressure drop across the transfer line per unit length is preferably between 0.01 bar/m and 0.2 bar/m, preferably between 0.0125 bar/m and 0.1 bar/m, most preferably between 0.0125 bar/m and 0.04 bar/m. Typical pressure at the heater inlet, $P_i$, is 5-30 bara, preferably 10-25 bara. Pressure at the outlet $P_o$ is typically 1.5-12 bara, preferably 7-11 bara.

In the case where the heater is positioned between a polymerisation reactor and a degassing vessel, the pressure drop in the heater is typically between 5% and 50%, preferably between 10 and 35%, of the total pressure drop between the polymerisation reactor and the entry to the degassing vessel.

By maintaining the temperature of the polymer-containing stream at the heater outlet above the dew point of the stream, but the internal surface of the transfer line below the softening point of the polymer, it is possible to ensure that all of the liquid in the stream is vaporised by the time the stream reaches the heater exit, but at the same time the risk of fouling is minimised. In the case where the heater is positioned between a polymerisation reactor and a degassing vessel, the temperature of the internal surface of the transfer line may be maintained above the temperature of the reactor. For a polymer having a density of 935-945 kg/$m^3$ the process-side wall temperature is typically controlled between 75 and 130° C., preferably between 85 and 105° C. For a polymer having a density of 955-965 kg/$m^3$ the process-side wall temperature is typically controlled between 80 and 135° C., preferably between 95 and 110° C.

The outlet temperature of the transfer line—specifically, the internal wall temperature of the line at its outlet immediately downstream of the final heated portion—is preferably maintained a temperature higher than the temperature of the internal wall of the line at its inlet immediately upstream of the first heated portion, more preferably at least 5° C. higher than the inlet temperature.

For the process of the invention it is very desirable to maintain the average velocity of the polymer-containing stream sufficiently high to avoid the risk of fouling or blockages. By "average" is meant the average velocity across the entire cross-section of the stream at any one point along the length of the transfer line. Hence it is preferred that the average velocity at the inlet $V_i$ is at least 2 m/s, preferably at least 5 m/s and more preferably at least 8 m/s. It is also desirable to maintain the velocity below the sonic velocity. Accordingly it is preferred that the average velocity at the outlet $V_o$ is less than 80 m/s, preferably less than 70 m/s. Preferably $V_o$ is at least 20 m/s. It is preferred that the ratio of average outlet velocity to average inlet velocity (where outlet and inlet of the transfer line are as defined above), $V_o/V_i$, is at least 1.1, typically between 1.2 and 15, preferably between 1.4 and 10, most preferably between 1.5 and 4.

In a preferred embodiment the process of the invention, in the case where the heater is positioned between a polymerisation reactor and a degassing vessel, the polymer-containing stream is heated such that at least 90 mol %, preferably at least 98 mol % and most optimally 100 mol % of the hydrocarbon fluids withdrawn from the polymerisation reactor operation are vaporised before entry into the degassing vessel. The degassing vessel preferably operates at a pressure greater than 2 bara, most preferably between 6 bara and 12 bara whilst maintaining a pressure drop across the length of the heater of less than 0.5 barh per tonne of polymer, most preferably between 0.1 barh/te and 0.3 barh/te. It has been found that this optimised low pressure drop per unit of production can be reliably operated even at high solids loadings at entry into the heater. It is preferred that the solids content of the polymer-containing stream is between 35 wt % to 70 wt %, most preferably between 50 wt % and 65 wt % when the stream enters the heater, and it is also preferred that the velocity of the stream at the entry into the heater does not vary by more than 15%, preferably no more than 5%, in any 30 second period. One way in which this can be achieved is by using a continuous rather than discontinuous off-take from the polymerisation reactor. Such high solids loading operation combined with the expanding diameter heater enables the pressure drop of the heater to be minimised.

The average Reynolds number across the cross-section of the stream at any point along the length of the transfer line of the heater should always be greater than 500000, preferably between 1 million and 10 million, most preferably between 1.8 million and 5 million.

The heating and depressurisation of the polymer stream as it travels along the transfer line to the degassing vessel causes a progressive vaporisation of the liquid in the stream and a resultant increase in velocity along the line. There are conflicting requirements to satisfy when designing the transfer line in order to ensure effective and reliable polymer transfer and heat transfer. Whilst high velocities enhance heat transfer and generally minimise fouling, they also lead to high pressure drops along the line. It is important therefore to be able to minimise transfer line length and the required heat transfer area whilst achieving a sufficiently de-volatised polymer at an acceptable temperature.

Regarding the construction of the heater itself, it is preferred that the ratio of the transfer line's outlet diameter $D_o$ to its inlet diameter $D_i$, $D_o/D_i$, is greater than 1, preferably between 1.2 and 10. Typically it is at least 1.3, and commonly at least 1.4. However this ratio is preferably no more than 4, and more preferably no more than 2, with a maximum of 1.9 being most preferred. We have found that increasing the diameter of the transfer line along its length allows a greater range of polymer-containing stream flowrates to be accommodated by the heater. A relatively small diameter at the inlet permits a relatively high velocity even at low flowrates, reducing the risk of fouling; whilst a relatively larger diameter at the outlet can avoid the risk of the velocity exceeding the sonic velocity even at high flowrates. Having such a range of capacities is particularly valuable during start-up and shutdown operations. In order to reduce the risk of downstream blockages it is also preferred that the outlet diameter $D_o$ of the transfer line is smaller than the solids outlet of the degassing vessel. $D_o$ is defined as the internal diameter of the transfer line at its outlet, and $D_i$ is the internal diameter of the transfer line at its inlet, where the outlet and inlet of the transfer line are defined as previously described.

The internal diameter D of the transfer line is preferably at least 20 mm, and more usually between 40 mm and 200 mm. Most preferred are internal diameters between 60 mm and 150 mm.

The length L of the heater, and therefore the transfer line, is preferably at least 20 m, more preferably at least 30 m, but usually no more than 600 m. A preferred range of lengths is from 50 m to 500 m, more preferably from 70 m to 300 m.

It is preferred that the ratio of the length L of the transfer line to its average internal diameter $D_{ave}$, $L/D_{ave}$, is from 500 to 10000, preferably from 1-500 to 3500, and more preferably from 2000 to 3000. If the transfer line is constructed from a number of sections each of different diameters, $D_{ave}$ is the average internal diameter of those sections weighted according to the length of each section; alternatively it may be calculated by reference to the total internal volume V of the line, where $V=(\pi D_{ave}^2 \cdot L)/4$.

If the transfer line increases in diameter along its length, It is preferred that the increase occurs in discrete steps rather than continuously. Typically there are one, two or three increases in diameter along the length of the pipe.

It is preferred that one or all of the sections of the line are generally upright rather than mounted horizontally, so that the line has a smaller footprint in the plant: in such a configuration, the first section of the line preferably has its inlet at the bottom such that the initial flow of material through the transfer line is upwards. It is preferred that less than 20%, most preferably less than 10% of the length of the transfer line is horizontal, and optimally the line is constructed substantially without horizontal sections. In one embodiment at least the inlet and exit of the heated transfer line are oriented vertically such that the inlet flow through the line is upwards and the outlet flow from the line is downwards. In one embodiment of the invention, the transfer line comprises a series of sections connected by bends (elbows), which are typically U-shaped such that the line doubles back on itself one or more times. The advantage of this configuration is that it makes the transfer line more compact in the plant. The sections between the elbows are usually straight. The bends may be heated like the rest of the line, but usually—in order to simplify the construction of the heater—they are not heated. It is also generally preferred that any expansion in diameter of the line occurs in an unheated section of the line; therefore sections of the line may be of different diameters with the increases in diameter occurring at one or more of the elbows, preferably at the exit of the elbow such that the velocity reduces at the exit of the elbow rather than at its inlet, and most preferably at the exit of an elbow at the top of a vertically heated section. The design of the expansion sections and the bends in the transfer line is key to reliable operation without fouling. The number of vertical or horizontal sections between elbows making up the total transfer line may be from 2 up to 10, although 3 to 7 sections is more common.

The elbows of the transfer line may have varying degrees of curvature. The radius of the curve defined by the elbow may be expressed as a multiple of the diameter D of the line at that point. The elbows typically have radii of between 3D and 30D, with 5D-20D being most preferred to ensure reliable operation without fouling whilst also minimising the footprint of the line. As previously stated the elbows are preferably U-shaped, although alternative options such as L-shaped elbows that permit a smooth flow path are not excluded. Obviously a transfer line formed in sections may employ a mixture of the above types of elbow, or indeed elbows of other angles such as 60° or 120°.

It has been found that the length of any one expansion section of the transfer line should be greater than 0.25D, preferably between 0.5D and 10D, most preferably between 0.75D and 3D. It is preferred that each expansion section is located immediately upstream or downstream of an elbow, preferably immediately downstream of an elbow. It is also preferred that the expansion is concentric, although other expansion geometries are also possible.

The total specific heat transfer area of the transfer line, which is its outer surface area in contact with the heating means, is preferably at least 0.5 m² of heat transfer area per tonne/h of production of polymer, typically between 0.7 and 10, more preferably between 1 and 5, most preferably between 1.5 and 3.5 of heat transfer area per tonne/h of production of polymer.

It is preferred that the heater inlet is at approximately the same elevation as the exit of the polymerisation reactor to which it is linked, preferably the transfer line from the polymerisation reactor to the heater inlet is essentially horizontal.

It is most preferred that the exit of the transfer line (at the degassing vessel entry point) is at a higher elevation than the inlet of the transfer line and/or the outlet of the polymerisation reactor.

The means for heating the transfer line usually comprises a jacket surrounding the line. The heater jacket may be in the form of an electrical heater, but it is preferred that it is in the form of a concentric pipe surrounding the line through which a heating fluid is passed. The most commonly used heating fluid is steam. It has been found that conditions can be best optimised by using desuperheated steam as the heating medium, particularly where the maximum saturation temperature is 0-30° C., and preferably no greater than 10° C., below the softening point of the polymer being heated. Whichever form it takes, the jacket may either provide the same heat input along the entire length of the transfer line, or may provide differential heating at different parts of the line. It is also possible that portions of the line (such as bends) are unheated, as discussed above. We have found that the optimum heat input along the length of the transfer line is achieved with a design such that temperature of the heating medium (or the internal wall temperature of the line) is greater at the inlet to the line than at its exit. Accordingly, as the vapour fraction in the polymer-containing stream as it passes along the line increases, it is preferred that the heating medium temperature (or the internal wall temperature of the line) is decreased. This can be done in a continuously graded manner, or in a number of discrete steps by means of sections of different temperature. Most preferred however is a jacket which operates at different temperatures in different parts of the line, usually by having independent supplies of the heating medium for each section where a different temperature is required.

In a preferred embodiment of the invention, the transfer line is heated by a concentric pipe using steam as a heating medium. The outlet temperature of the transfer line is preferably controlled using the steam flowrate: for a given steam temperature this has the benefit of enabling control of the transfer line wall temperature, to ensure a lower temperature at low polymer stream flowrates and a higher temperature at higher flowrates when velocities are higher.

One way of increasing further the temperature of the polymer-containing stream itself at the transfer line outlet (apart from increasing the energy input into the heater) is to increase the solids content of the stream. This can be done by increasing the solids content of the stream withdrawn from the polymerisation reactor and/or by using a solids concentrating device upstream of the transfer line. The solids can carry more heat than the liquid or gaseous components of the stream, thereby requiring a lower input from the transfer line heater in order to achieve the desired temperature.

The use, upstream of the transfer line, of a solids concentrating device with an upstream diluent flush (as described in our patent EP1118624) is a preferred embodiment of the present invention, and enables the monomer concentration in the transfer line to be minimised, thereby reducing the risk of fouling.

It is preferred that the pipe is easily separable along the length of the heater to facilitate cleaning. Preferably the pipe is flanged at 5-15 m intervals. In the case where heating is effected using a jacket containing a heating fluid, it is preferred that the heating fluid does not cover any flange.

In order to maximise heat transfer into the polymer-containing stream, the pipe is preferably made from a material having a thermal conductivity greater than 30 $Wm^{-2}K^{-1}$, preferably greater than 40 $Wm^{-2}K^{-1}$. The pipe is typically seamless, although seam welded pipe is preferred where high heat transfer is required.

It is preferred that all of the polymer-containing stream exiting the polymerisation reactor is passed through a single transfer line, particularly at start-up or at times when the velocity at the exit of a single heater is less than 50 to 60 m/s. Such a transfer line may be fed by one or more withdrawal lines from the reactor. The stream withdrawn from the reactor may be concentrated, preferably by gravitational or centrifugal means, most preferably using a hydrocyclone, prior to passing through the transfer line. However it is also within the scope of this invention to provide multiple parallel transfer lines to accept the polymer-containing stream, each of which is arranged according to the invention. Accordingly a further aspect of the invention provides a process for heating a polymer-containing stream being transferred from a polymerisation reactor that is increasing its production rate to a degassing vessel, which comprises a) passing the stream through a first heater or heaters each comprising a transfer line for the stream and means for heating the transfer line, and increasing the flow-rate of the stream preferably whilst maintaining the temperature of the polymer-containing stream at the exit of each heater above the dew point of the stream, and the temperature of the stream at any point along the length of the each transfer line below the softening point of the polymer, and then b) passing part of the stream through an additional heater arranged in parallel to the first heater, said additional heater also comprising a transfer line for the stream and means for heating the transfer line, preferably whilst maintaining the temperature of the polymer-containing stream at the exit of all heaters above the dew point of the stream, and the temperature of the stream at any point along the length of the all transfer lines below the softening point of the polymer.

A related aspect of the invention provides a process for heating a polymer-containing stream being transferred from a polymerisation reactor to a degassing vessel, which comprises a) passing the stream through at least two heaters arranged in parallel and each comprising a transfer line for the stream and means for heating the transfer line, preferably whilst maintaining the temperature of the polymer-containing stream at the exit of each heater above the dew point of the stream, and the temperature of the stream at any point along the length of the each transfer line below the softening point of the polymer, and decreasing the flow-rate of the stream until the velocity at the exit of the heater falls below 40 m/s, and then b) shutting down one of the heaters and passing the stream only through the remaining heater or heaters.

In an alternative embodiment, part of the stream is diverted through an additional heater arranged in parallel to the first heater if either $V_o/V_i$, falls to or below the desired minimum (usually 0.8, preferably 1.3), or alternatively if the pressure drop across the transfer line per unit length exceeds the desired maximum (usually 0.2 bar, preferably 0.1 bar), said additional heater also comprising a transfer line for the stream and means for heating the transfer line. In this embodiment also, the temperature of the polymer-containing stream at the exit of all heaters is preferably maintained above the dew point of the stream, and the temperature of the stream at any point along the length of the all transfer lines below the softening point of the polymer.

In such a parallel heater embodiment of the invention, not all of the transfer lines may be required in service at any one time. In a further embodiment the polymerisation reactor has a plurality of withdrawal lines, each of which has its own transfer line. The invention also includes within its scope the use of single or parallel solids concentrating devices, with the usual arrangement being one solids concentrating devices located upstream of each transfer line.

In the parallel heater embodiment, it is preferred that when at least two heaters are operating, the average stream velocity across any cross-section of each heater's transfer line is maintained between 2 and 100 m/s, most preferably between 10 and 70 m/s.

The performance of each transfer line can be monitored using parameters including the steam flow into the heating jacket or position of the steam valve to measure the heat input (duty) to the stream, the pressure difference across the heater and the reactor pressure valve output to measure the flow or flow ratio into each transfer line, the relationship between steam flow and outlet temperature for each heater, mass balance of the reactor to calculate the total flow into all the heaters, and the difference between the vapour temperature at the heater outlet and the dew point of the process stream. Pressure drops across the transfer lines of each heater are preferably essentially the same as in the single heater embodiment as described above.

When operating more than one transfer line (heater) in parallel, minor differences in installation and operating conditions of the transfer lines and associated upstream and downstream equipment and pipework can result in the transfer lines having unbalanced flows of slurry (loadings). Without correction this can result in the transfer lines needing to be commissioned or decommissioned more often in order to maintain each within the correct operating range. To avoid this, it is preferred that the slurry loading on each transfer line is automatically balanced by first determining the slurry flow through each transfer line, then calculating the average flow to all the transfer lines, and then applying a bias to a control valve upstream of each transfer line to adjust the feed rate in order to bring the slurry loading of each transfer line to the average value. Preferably this is accomplished using the steam flow to the jacket surrounding each transfer line (ie the amount of heating applied to each transfer line) as a means for determining the slurry flow through each transfer line, since the steam flow is controlled to achieve the required temperature at the outlet of the transfer line, and the outlet temperature is determined by the slurry flow through each transfer line. The average of the steam flow to the transfer lines is then calculated and a bias is then applied to a control valve upstream of each transfer line to adjust the feed rate in order to bring the loading of each transfer line, as measured by the steam flow, to the average value. The primary control function of the feed valves to all the transfer lines is to control the reactor pressure by manipulating the overall feed from the reactor to each transfer line. Thus all the control valves operate in parallel, opening and closing together, with the balancing control superimposed onto this action to balance the load on the transfer lines.

The slurry loading on the transfer lines may alternatively be determined by other means described previously, such as flow/velocity or pressure drop. The overall feed to the transfer lines may be controlled by directly from reactor pressure or by flow control.

An available off-line heater should be commissioned when the chosen indicator(s) of the heater performance indicates that at least one of the on-line heaters is at 95%, preferably 90%, and most preferably 80% or more of maximum capacity. When two or more heaters are operating in parallel, one of them should be shut down when at least one of them is operating at less than 60%, preferably less than 40% of maximum capacity. A simple indicator of heater capacity is the output of the heater steam control valve, which controls the input of steam into the jacket surrounding the heater and hence the supply of heat to the heater: thus an additional off-line heater is preferably commissioned when the steam control valve to any one principal heating section is greater than 90% open.

In both single heater and multiple parallel heater embodiments, the flowrate of the polymer-containing stream withdrawn from the polymerisation reactor is preferably controlled using a pressure or flow control valve, most preferably located between a solids concentrating device and the transfer line heater inlet. The control valve is designed to have a pressure drop of between 45% and 90%, most preferably 50% and 80%, of the pressure drop between the reactor and the entry to the first downstream vessel. The heated transfer line is preferably designed to have a pressure drop between 5% and 75%, most preferably between 10 and 35%, of the pressure drop between the reactor and the entry to the degassing vessel. The ratio of the pressure drop across the control valve to the pressure drop across the heater is between 0.8 and 5, most preferably between 1 and 2.

The polymer-containing stream may contain a vapour component as well as a liquid component. Typically the vapour fraction of the fluid component of the polymer-containing stream at the inlet of the heater varies from 5 to 60 mol %. In one preferred embodiment of the present invention where there is a pressure or flow control valve upstream of the heater, and the vapour fraction of the stream at the heater inlet is between 25 and 60 mol %. The vapour fraction of the fluid component of the stream at the outlet of the heater can vary from 70 to 100 mol %, it is typically 95-100 mol %, most preferably greater than 99 mol %.

This invention can be applicable to any polymerisation process (eg gas-phase, slurry, or solution) containing a polymer stream that needs to be heated to volatilise liquid during depressurisation.

Processes for the co-polymerisation of olefins in the slurry phase are well known in the art. Such processes can be conducted for example by introducing the monomer and comonomer into a stirred tank or continuous loop reactor comprising polyolefin and a catalyst for the polymerisation. The reactor is typically controlled to achieve a desired melt index and density for the polymer at an optimum production and temperature.

Polyethylene slurry polymerisation processes typically withdraw polymer from the polymerisation reactor with significant quantities of liquid hydrocarbons, and the present invention is therefore particularly relevant to such processes. The slurry in such reactors typically comprises the particulate polymer, the hydrocarbon diluent(s), (co)monomer(s), catalyst, chain terminators such as hydrogen and other reactor additives. In particular the slurry will comprise 20-75, preferably 30-70 weight percent based on the total weight of the slurry of particulate polymer and 80-25, preferably 70-30 weight percent based on the total weight of the slurry of suspending medium, where the suspending medium is the sum of all the fluid components in the reactor and comprises the diluent, olefin monomer and any additives; the diluent can be an inert diluent or it can be a reactive diluent such as a liquid olefin monomer. Where the principal diluent is an inert diluent the olefin monomer typically comprises 2-20 wt %, more particularly 4-10 wt % of the slurry.

Polymerisation is typically carried out at temperatures in the range 50-125° C. and at pressures in the range 1-100 bara. The catalyst used can be any catalyst typically used for olefin polymerisation such as chromium oxide, Ziegler-Natta or metallocene-type catalysts. The product slurry comprising polymer and diluent, and in most cases catalyst, olefin monomer and comonomer can be discharged intermittently or continuously, optionally using concentrating devices such as hydrocyclones or settling legs to minimise the quantity of fluids withdrawn with the polymer.

This invention is particularly related to polymerisation in a loop reactor where the slurry is circulated in the reactor typically by means of a pump or agitator. Liquid full loop reactors are particularly well known in the art and are described for example in U.S. Pat. No. 3,152,872, U.S. Pat. No. 3,242,150 and U.S. Pat. No. 4,613,484. The loop reactor is of a continuous tubular construction comprising at least two, for example four, vertical sections and at least two, for example four, horizontal sections. The heat of polymerisation is typically removed using indirect exchange with a cooling medium, preferably water, in jackets surrounding at least part of the tubular loop reactor. The volume of the loop reactor can vary but is typically in the range 20 to 170 m$^3$.

In commercial plants, the particulate polymer is separated from the diluent in a manner such that the diluent is not exposed to contamination so as to permit recycle of the diluent to the polymerization zone with minimal if any purification. Separating the particulate polymer produced by the process of the present invention from the diluent typically can be by any method known in the art for example it can involve either (i) the use of discontinuous vertical settling legs such that the flow of slurry across the opening thereof provides a zone where the polymer particles can settle to some extent from the diluent or (ii) continuous product withdrawal via a single or multiple withdrawal ports, the location of which can be anywhere on the loop reactor but is usually adjacent to the downstream end of a horizontal section of the loop. As previously discussed, the operation of large diameter reactors with high solids concentrations in the slurry minimises the quantity of the principal diluent withdrawn from the polymerisation loop. Use of concentrating devices on the withdrawn polymer slurry such as hydrocylones (single or in the case of multiple hydrocyclones in parallel or series) further enhances the recovery of diluent in an energy efficient manner since significant pressure reduction and vaporisation of recovered diluent is avoided.

The withdrawn, and preferably concentrated, polymer slurry is usually depressurised prior to being transferred via the heater of the present invention to a primary flash vessel.

The diluent and any monomer vapours recovered in the primary flash vessel are typically condensed, preferably without recompression, and reused in the polymerization process. The pressure of the primary flash vessel is usually controlled to enable condensation with a readily available cooling medium (e.g. cooling water) of essentially all of the flash vapour prior to any recompression. The pressure in said primary flash vessel is generally in the range 2-25 bara, more typically 5-20 bara and most often 6-11 bara. The solid material recovered from the primary flash vessel is usually passed to a secondary flash vessel to remove residual volatiles. Alternatively the slurry may be passed to a flash vessel of lower pressure than in the above mentioned primary vessel such that recompression is needed to condense the recovered diluent. Use of a high pressure flash vessel is preferred.

More specifically, an example of the type of polymerisation process for which the invention is particularly useful is the continuous polymerization of olefins, preferably alpha mono olefins, in an reaction zone, preferably an elongated tubular closed loop. The olefin(s) is continuously added to, and contacted with, a catalyst in a hydrocarbon diluent. The monomer(s) polymerise to form a slurry of solid particulate polymer suspended in the polymerisation medium or diluent. The rate of withdrawal of polymer product is controlled by a valve upstream of the heater of the invention.

The solids concentration in the slurry in the reactor will typically be above 20 vol %, preferably about 30 volume %, for example 20-40 volume %, preferably 25-35 volume % where volume % is [(total volume of the slurry−volume of the suspending medium)/(total volume of the slurry)]×100. The solids concentration measured as weight percentage, which is equivalent to that measured as volume percentage, will vary according to the polymer produced but more particularly according to the diluent used. Where the polymer produced is polyethylene and the diluent is an alkane, for example isobutane, it is preferred that the solids concentration is above 30 wt % in particular above 40 wt %, for example in the range 40-60 wt % preferably 45-55 wt % based on the total weight of the slurry. We have found that for high solids loadings, particularly above 40 wt %, reliable product withdrawal and heating between the polymerisation reactor and the degassing vessel (as evidenced by fouling, flow variations and/or heat transfer) can be maintained within acceptable operating limits by use of the heater of the invention.

This type of process may optionally be carried out in a multiple reactor system. The second or any subsequent reactor of the multiple reactor system may be another loop reactor or any reactor for the polymerisation of olefins, for example a fluidised-bed reactor. However, usually the second or any subsequent reactor of the multiple reactor system is another loop reactor. Such multiple reactor systems can be used to make monomodal or multimodal, preferably multimodal polymers.

In the case of multiple reactors in series, a first reactor of the series is supplied with catalyst or prepolymer and optionally the cocatalyst in addition to the diluent and monomer, and each subsequent reactor is supplied with, at least, monomer, in particular ethylene and with the slurry arising from a preceding reactor of the series, this mixture comprising the catalyst and a mixture of the polymers produced in a preceding reactor of the series. It is possible to supply a second reactor and/or, if appropriate, at least one of the subsequent reactors with fresh catalyst and/or cocatalyst. However, it is more common to introduce the catalyst and the cocatalyst exclusively into a first reactor.

In the case where the plant comprises at least two reactors in series, the polymer of highest melt index and the polymer of lowest melt index can be produced in two adjacent or non-adjacent reactors in the series. Hydrogen is maintained at (i) a low (or zero) concentration in the reactor(s) manufacturing the high molecular weight components, e.g. hydrogen percentages including between 0-0.1 vol % and at (ii) a very high concentration in the reactor(s) manufacturing the low molecular weight components e.g. hydrogen percentages between 0.5-2.4 vol %. The reactors can equally be operated to produce essentially the same polymer melt index in successive reactors.

When such reactor systems produce polymers of molecular weights less than 50 kDaltons or greater than 150 kDaltons there have in the past been observed particular problems with reactor fouling and agglomeration in the heater between the polymerisation reactor and the degassing vessel. These problems can be accentuated by high polymer solids concentrations in the heater. This is another problem which can be ameliorated by use of the heater of the present invention.

EXAMPLE 1

A polymerisation reactor polymerising ethylene and hexene comonomer in isobutane diluent is operated at 41 bar pressure and at a temperature of 95° C. This discharges a polymer-containing stream which is in the form of a slurry, the liquid component of which essentially comprises 91 mol % isobutane, 8 mol % unreacted ethylene and 1 mol % hexene. The solids content of the slurry is about 40 wt %, comprising polyethylene having a density of 940 kg/m$^3$ and also some unused catalyst. These are the same conditions as in Example 1.

The slurry from the reactor passes through a pressure control valve to lower the pressure, before entering the heater of the invention. Conditions at the inlet to the heater are:

Temperature: 82.4° C.
Pressure $P_i$: 17.4 bara
Velocity $V_i$: 10.7 ms$^{-1}$
Reynolds number: 1.72 million
Solids concentration of 40 wt %; of the remaining fluid phase, 40 wt % is vapour and 60 wt % liquid.

The heater is 187 m in length and comprises 3 straight and vertical sections each of 58 m length, which are connected by 180° elbows; the elbows together contribute 13 m of the total length and are not heated. All the sections have an internal diameter of 78 mm and wall thickness of 5.5 mm, giving a value of L/D$_{ave}$ of about 2397. The thermal conductivity of the entire pipe wall is 46.4 W/mK. The heater element is in the form of concentric outer tubes extending along each of the 26 m sections, through which is passed desuperheated steam.

The slurry passes through the heater at a rate of 15 tonne/hour. The length and diameter of the pipe, the heat input from the heating medium to the slurry, and the velocity and initial solids content of the slurry are all calculated to ensure that the heat transfer to the slurry during its passage through the heater is sufficient to ensure that the liquid phase is entirely vaporised by the time the slurry exits the heater. The slurry exits the heater at a temperature of 76° C., a pressure $P_o$ of 9 bara and a velocity $V_o$ of 63.3 m/s ($V_o/V_i$=5.9), with a Reynolds number of 3.3 million. This equates to a pressure drop across the heater of 0.045 bar/m. At this pressure, the dewpoint of the vapour would be about 60.8° C., so the stream is 15° C. above the dewpoint, and the liquid is completely vaporised with no danger of any condensation of the vapour as it exits the heater.

The internal wall temperature of the heater is between 89° C. and 93° C. throughout the length of the heater; this compares with a softening point of the polymer of about 128° C. The heat transfer coefficient from steam to slurry across the wall of the heater is calculated as 984 W/m²K.

EXAMPLE 2

In this Example, the heater has a lower $L/D_{ave}$ ratio, but also an increasing diameter.

A polymerisation reactor polymerising ethylene and hexene comonomer in isobutane diluent is operated at 40 bar pressure and at a temperature of 95° C. This discharges a polymer-containing stream which is in the form of a slurry, the liquid component of which essentially comprises 91 mol % isobutane, 8 mol % unreacted ethylene and 1 mol % hexene. The solids content of the slurry is about 40 wt %, comprising polyethylene having a density of 940 kg/m³ and also some unused catalyst.

The slurry from the reactor first passes through a hydrocyclone to concentrate the solids to 50 wt % and then a pressure control valve to lower the pressure, before entering the heater of the invention. Conditions at the inlet to the heater are:

Temperature: 76° C.
Pressure $P_i$: 14.4 bara
Velocity $V_i$: 16.6 ms⁻¹
Reynolds number: 2 million
Solids concentration of 50 wt %; of the remaining fluid phase, 40 wt % is vapour and 60 wt % liquid.

The heater is 152 m in length and comprises 5 straight and vertical sections each of 26 m length, which are connected by 180° elbows; the elbows together contribute 22 m of the total length. Each of the first three sections has an internal diameter of 78 mm whilst each of the remaining two sections has an internal diameter of 102 mm. The single increase in diameter occurs at the exit of the elbow connecting the third and fourth sections. Thus the heater has a value of $D_o/D_i$ of 1.33 and a value of $L/D_{ave}$ of about 1730. The thickness of the 78 mm diameter pipe wall is 5.5 mm, and the thickness of the 102 mm diameter pipe wall is 6.0 mm. As in Example 1 the thermal conductivity of the entire pipe wall is 46.4 W/mK, and the heater element is in the form of concentric outer tubes extending along each of the 58 m straight sections, through which is passed desuperheated steam.

The slurry passes through the heater at a rate of 20 tonne/hour. The length and diameter of the pipe, the heat input from the heater, and the velocity and initial solids content of the slurry are all calculated to ensure that the heat transfer to the slurry during its passage through the heater is sufficient to ensure that the liquid phase is entirely vaporised by the time the slurry exits the heater. The slurry exits the heater at a temperature of 80° C., a pressure $P_o$ of 10 bara and a velocity $V_o$ of 30 n/s ($V_o/V_i$=1.78), with a Reynolds number of 2.7 million. This equates to a pressure drop across the heater of 0.03 bar/m. At this pressure, the dewpoint of the vapour would be about 65° C., so the stream is 15° C. above the dewpoint, and the liquid is completely vaporised with no danger of any condensation of the vapour as it exits the heater.

The internal wall temperature of the heater is between 89° C. and 93° C. throughout the length of the heater; this compares with a softening point of the polymer of about 128° C. The heat transfer coefficient from steam to slurry across the wall of the heater is calculated as 600 W/m²K.

The invention claimed is:

1. Process for heating a polymer-containing stream being transferred from a polymerization reactor to a degassing vessel operating at a pressure between 6 bara and 12 bara, comprising passing the stream through a heater comprising a transfer line for the stream and means for heating the transfer line, wherein the ratio of the stream velocity at the outlet of the heater to that at the inlet, $V_o/V_i$, is at least 1.1, typically between 1.2 and 4, the total specific heat transfer area of the transfer line is at least 0.5 m² per tonne/h of production of polymer, and the pressure drop across the length of the heater is less than 0.5 bar per tonne/h of polymer, such that at least 90 mol % of the hydrocarbon fluids withdrawn from the polymerization reactor operation are vaporized before entry into the degassing vessel.

2. Process according to claim 1, wherein the transfer line for the stream is at least 20 m in length, the temperature of the polymer-containing stream at the heater exit is above the dew point of the stream, and the temperature of the stream along the length of the transfer line is maintained below the softening point of the polymer, where the softening point of the polymer is defined as the Vicat softening temperature according to ASTM D1525, ISO 306 under a load of 10N.

3. Process according to claim 1 or 2 in which the polymerization reactor is increasing its production rate, which comprises a) passing the polymer-containing stream through a first heater or heaters each comprising a transfer line for the stream and means for heating the transfer line, and increasing the flow-rate of the stream while maintaining the temperature of the polymer-containing stream at the exit of each heater above the dew point of the stream, and the temperature of the stream along the length of the each transfer line below the softening point of the polymer, and then b) passing part of the stream through an additional heater arranged in parallel to the first heater, said additional heater also comprising a transfer line for the stream and means for heating the transfer line, whilst maintaining the temperature of the polymer-containing stream at the exit of all heaters above the dew point of the stream, and the temperature of the stream at any point along the length of the all transfer lines below the softening point of the polymer.

4. Process according to claim 1, wherein part of the stream is passed through said additional heater when at least one of the on-line heaters is at 80% or more of maximum capacity.

5. Process according to claim 1, which comprises a) passing the polymer-containing stream through at least two heaters arranged in parallel and each comprising a transfer line for the stream and means for heating the transfer line, while maintaining the temperature of the polymer-containing stream at the exit of each heater above the dew point of the stream, and the temperature of the stream along the length of the each transfer line below the softening point of the polymer, and decreasing the flow-rate of the stream until either the velocity at the exit of the heater falls below 40 m/s, and then b) shutting down one of the heaters and passing the stream only through the remaining heater or heaters.

6. Process according to claim 5, wherein one of the heaters is shut down when at least one of them is operating at less than 60% of maximum capacity.

7. Process according to claim 1, wherein the temperature of the polymer-containing stream at the, or each, heater exit is 5-20° C. above the dew point of the stream.

8. Process according to claim 1, wherein the temperature of the internal surface of the or each transfer line at any point along its length is maintained below the softening point of the polymer.

9. Process according to claim 1, wherein the temperature of the stream at any point along the length of the or each transfer line is maintained at 10° C. or more below the softening point of the polymer.

10. Process according to claim 1, wherein the outlet of the or each transfer line is linked directly or indirectly to a degassing vessel.

11. Process according to claim 10, wherein the inlet of the or each transfer line is linked directly to a polymerization reactor.

12. Process according to claim 10, wherein the pressure drop in the or each heater is between 5% and 50% of the total pressure drop between the polymerization reactor and the entry to the degassing vessel.

13. Process according to claim 10, wherein prior to entering the or each heater, the polymer-containing stream passes through a pressure control valve which introduces a pressure drop of between 45% and 90% of the total pressure drop between the polymerization reactor and the entry to the degassing vessel.

14. Process according to claim 10, wherein prior to entering the or each heater, the polymer-containing stream passes through a pressure control valve which introduces a pressure drop of between 45% and 90% of the total pressure drop between the polymerization reactor and the entry to the degassing vessel, and the ratio of the pressure drop across the pressure control valve to the pressure drop across the or each heater is between 0.1 and 2.

15. Process according to claim 10, wherein the polymer-containing stream is heated in the or each heater such that at least 90 mol % of the hydrocarbon fluids withdrawn from the polymerization reactor are vaporized before entry into the degassing vessel.

16. Process according to claim 9, wherein the stream withdrawn from the reactor is concentrated prior to passing through the or each heater.

17. Process according to claim 11, wherein the polymer-containing stream is continuously withdrawn from the polymerization reactor.

18. Process according to claim 1, wherein the pressure $P_i$ at the or each heater inlet is 5-30 bara.

19. Process according to claim 1, wherein the pressure $P_o$ at the or each heater outlet is 5-12 bars.

20. Process according to claim 1, wherein the pressure drop across the or each transfer line per unit length is between 0.01 bar/m and 0.2 bar/m.

21. Process according to claim 1, wherein the inlet velocity $V_i$ is at least 2 m/s.

22. Process according to claim 1, wherein the outlet velocity $V_o$ is less than 80 m/s.

23. Process according to claim 1, wherein the Reynolds number at any point within the transfer line of the or each heater is always greater than 500000.

24. Process according to claim 1, wherein the solids content of the polymer-containing stream when it enters the or each heater is between 35 wt % to 70 wt %.

25. Process according to claim 1, wherein the polymer-containing stream contains active polymer.

26. Process according to claim 1, wherein the or each heater is arranged in the form of multiple parallel transfer lines each of which is adapted to accept the polymer-containing stream.

27. Process according to claim 26, wherein the flow of polymer-containing stream through each transfer line is balanced by first determining the slurry flow through each transfer line, then calculating the average flow to all the transfer lines, and then applying a bias to a control valve upstream of each transfer line to adjust the feed rate in order to bring the slurry loading of each transfer line to the average value.

28. Process according to claim 26, wherein the slurry flow through each transfer line is determined by measuring the steam flow to the heating jacket surrounding each transfer line.

29. Process according to claim 6, wherein one of the heaters is shut down when at least one of them is operating at less than 40% of maximum capacity.

30. Process according to claim 9, wherein the temperature of the stream at any point along the length of the or each transfer line, and also the internal surface of the or each transfer line at any point along its length, is maintained at 20° C. or more below the softening point of the polymer.

31. Process according to claim 12, wherein the pressure drop in the or each heater is between 10 and 35% of the total pressure drop between the polymerization reactor and the entry to the degassing vessel.

32. Process according to claim 13, wherein the pressure drop is between 60% and 80% of the total pressure drop between the polymerization reactor and the entry to the degassing vessel.

33. Process according to claim 14, wherein the pressure drop through the pressure control valve is between 60% and 80% of the total pressure drop between the polymerization reactor and the entry to the degassing vessel, and the pressure drop across the or each heater is between 0.2 and 0.5.

34. Process according to claim 15, wherein at least 98 mol % of the hydrocarbon fluids withdrawn from the polymerization reactor are vaporized before entry into the degassing vessel.

35. Process according to claim 16, wherein the stream withdrawn from the reactor is concentrated using a hydrocyclone.

36. Process according to claim 18, wherein the pressure $P_i$ at the or each heater inlet is 10-25 bara.

37. Process according to claim 19, wherein the pressure $P_o$ at the or each heater outlet is 7-11 bara.

38. Process according to claim 20, wherein the pressure drop across the or each transfer line per unit length is between 0.0125 bar/m and 0.04 bar/m.

39. Process according to claim 21, wherein the inlet velocity $V_i$ is at least 5 m/s.

40. Process according to claim 39, wherein the inlet velocity $V_i$ is at least 8 m/s.

41. Process according to claim 22, wherein the outlet velocity $V_o$ is less than 70 m/s.

42. Process according to claim 23, wherein the Reynolds number at any point within the transfer line of the or each heater is between 1.8 million and 5 million.

43. Process according to claim 24, wherein the solids content of the polymer-containing stream when it enters the or each heater is between 50 wt % and 65 wt %.

44. Process according to claim 7, wherein the temperature of the polymer-containing stream at the, or each, heater exit is 10-15° C. above the dew point of the stream.

* * * * *